Oct. 18, 1932.   C. E. F. AHLM   1,883,441
TRANSMISSION MECHANISM
Filed May 2, 1930   4 Sheets-Sheet 1

Oct. 18, 1932.　　　C. E. F. AHLM　　　1,883,441
TRANSMISSION MECHANISM
Filed May 2, 1930　　　4 Sheets-Sheet 3

Oct. 18, 1932.  C. E. F. AHLM  1,883,441
TRANSMISSION MECHANISM
Filed May 2, 1930   4 Sheets-Sheet 4

INVENTOR
Charles E. F. Ahlm,
BY
Justin W. Macklin.
ATTORNEY

Patented Oct. 18, 1932

1,883,441

UNITED STATES PATENT OFFICE

CHARLES E. F. AHLM, OF CLEVELAND HEIGHTS, OHIO, ASSIGNOR TO THE AUTOMOTIVE RESEARCH CORPORATION, OF WARREN, OHIO, A CORPORATION OF DELAWARE

TRANSMISSION MECHANISM

Application filed May 2, 1930. Serial No. 449,113.

This invention relates to change speed gearing for power transmission particularly adapted for use in motor vehicles. The demand in the automotive industry for more quietly operating gearing has developed the internal-external gear arrangement. In this type of gearing, the ring gear in the form of a hollow cylinder having internal and external gear teeth is used.

Heretofore great difficulties have been encountered in providing a suitable bearing mounting for such a gear ring mounted eccentrically of the driving shaft. The difficulties arise largely from the very pronounced space and size limitation imposed by the requirements for commercial use.

Such ring gears should be so supported as to provide minimum overhang, and, concurrently, the bearing surfaces of the ring should be relatively small in diameter, the first to prevent distortion of the ring gear normal to its axis, the second to obtain relatively low speeds of bearings to prevent undue wear. It is very important also to economize on the weight and cost of such parts without sacrifice of strength and efficiency.

It is therefore one of the objects of my invention to accomplish these results at a minimum expense, and to overcome the difficulties and objections heretofore encountered. The present invention provides for supporting the eccentric ring gear by suitable bearings with only a very slight increase in the overall length of the gear train, with a minimum overhang and a small diameter bearing surface.

Other objects and advantages of my invention will become apparent from the following specification in which reference is made to the accompanying drawings. The same reference numerals designate the same parts in the various views.

In the drawings:—

Figure 1:
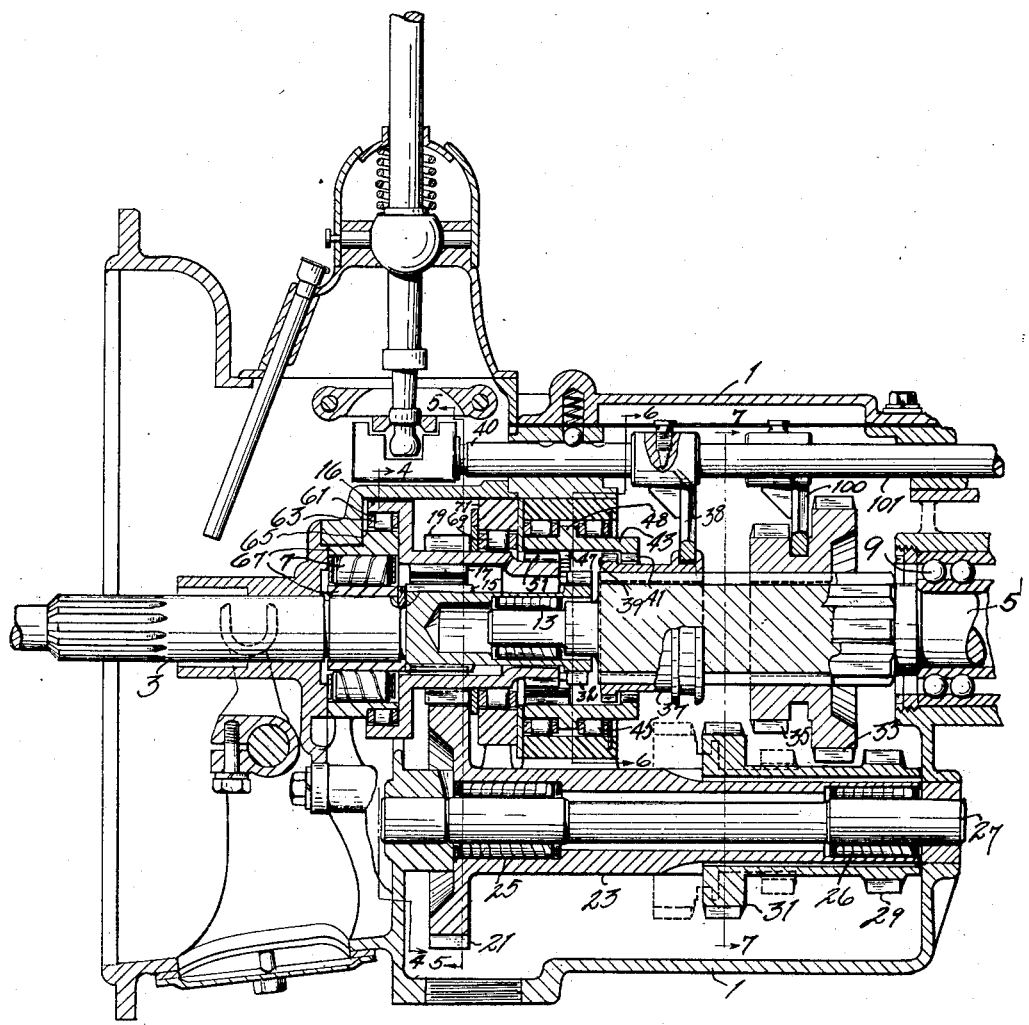
Fig. 1 is a longitudinal vertical section through a transmission gearing embodying one form of my invention.

Referring to the drawings, a transmission housing 1 is shown, in which are mounted a driving shaft 3 and a driven shaft 5 concentric therewith. These shafts are rotatable in suitable bearings 7 and 9 respectively, mounted in the ends of the housing. The driving shaft 3 is recessed at its inner end to receive the adjacent end of the driven shaft 5 which is rotatable therein in a suitable pilot bearing 13.

The driving shaft 3 extends through a gear ring 16, eccentric therewith, and is provided with an external gear 15, engaging a complementary internal reduction gear 17 of the gear ring 16. An external gear 19 of the gear ring 16, preferably radially aligned with the internal gear 17, engages a spur gear 21 of a countershaft 23. This countershaft may be in the form of a sleeve internally recessed at the ends to receive bearings 25 and 26 which rotatably support the sleeve on a stationary shaft 27 rigidly mounted in the housing 1.

Keyed to the opposite end of the countershaft 23 are reduction gears 29 and 31, shown as integral, adapted for engagement with complementary reduction gears 33 and 35 of the driven shaft 5. These gears, here shown as an integral member, may be splined or keyed onto the driven shaft 5 and are shiftable axially of the driven shaft by the usual shifting levers and rods, such as the yoke 100 carried by a rod 101. These gears provide the first and second speeds of the transmission, first speed being through 29 to 33, and second speed being through 31 to 35.

The gear ring 16 is provided with a second external gear 51 engaging a complementary internal reduction gear 47 of a hub 43 which is rotatably mounted in external bearings 45 in the housing 1. These bearings are preferably arranged to embrace an annular rib 48 and prevent endwise shifting of the hub 43. This hub is provided with internal clutch teeth 41 capable of engagement with the external clutch teeth 39 of a clutch member 37. The clutch member 37 is splined or keyed onto the driven shaft 5 and shiftable axially thereof by a suitable arm 38 operated by a shifting rod 40. This engagement provides the third speed of the gearing.

A fourth speed may be obtained by shifting the clutch member 37 so that the complementary splines engage splines 32 formed on the driving shaft 3, giving a direct connection from the driving shaft to the driven shaft. For ease in shifting at higher speeds, the ends of alternate splines 47 of the driving shaft may be cut back a short distance.

Figure 7:
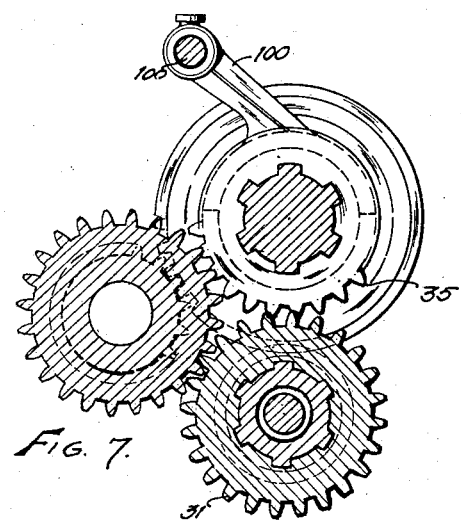
Fig. 7 is a partial sectional view taken on the line 7—7 of Fig. 1.

A reverse gear adapted to drive the driven shaft 5 through the countershaft 23, and intermediate reduction gears is shown in dotted lines somewhat below its true position for the purposes of clearness. The actual relative positions of such gears are shown in Fig. 7.

My invention, comprising the bearing mounting for the ring gear 16 will now be more fully described. As stated, the gear ring is eccentric to the driving shaft 3, which precludes mounting it on bearings supported by the driving shaft 3. Therefore I preferably form the gears on the gear ring so that the internal gear 17 and the external gear 19 are radially aligned. By this arrangement any thrusts from gears 15 and 21, tending to spring the ring gear out of its normal axial alignment, are counteracted. This arrangement likewise makes for compactness and reduced length of this ring gear. The external gear 51 is preferably located near one end of the gear ring 16. The diameter of a portion of the gear ring 16 at the opposite end from gear 51 is increased to form an internal annular bearing surface 61. Bearings 63 are adapted to lie between the bearing surface 61 and a complementary bearing surface 65 to rotatably support the end of the gear ring 16. Such a complementary bearing surface may be formed by providing an annular external bearing surface on the bearing ring 67 which is supported by the housing 1. This ring likewise rotatably supports the driving shaft 3. Such annular bearing surface would be eccentric to the surface of the bearing ring 67 which supports the driving shaft 3.

In this manner a saving in axial length is effected with only a very slight increase in size radially. The enlarged portion of the gear ring occupies what otherwise would be unused space and so no substantial change in the housing is necessary. Again, by this arrangement, the relatively small diameter of the bearing ring is retained, permitting keeping the bearings close to the axis of rotation so as to reduce their speed and wear.

Intermediate the external gears are external bearings 69 rotatably supporting the gear ring 16 and, in turn, supported by a suitable bearing ring 71 in the housing 1. It is desirable that these bearings be located approximately centrally of and close to the external gears 19 and 51, so as to take the thrust on the gears as nearly direct as possible. This arrangement, while reducing the unsupported overhang to a minimum, likewise counteracts any stresses on the overhanging portion by a light reactionary thrust on the bearings 63, operating on a comparatively long lever arm about the bearings 69 as a fulcrum.

Figure 2:
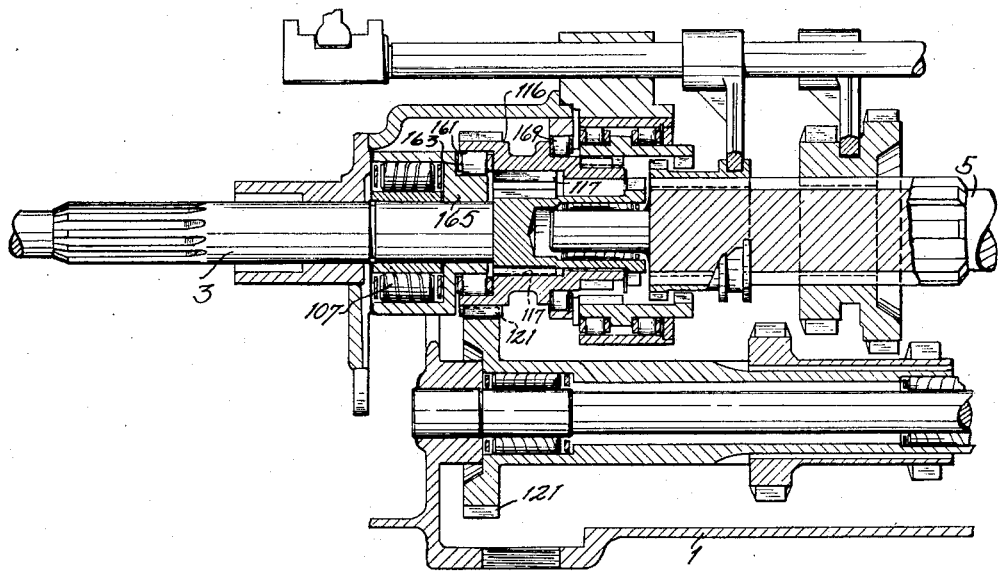
Fig. 2 is a partial longitudinal vertical section through a similar transmission gearing embodying still another form of my invention.

Fig. 2 illustrates a modified form of my invention in which the gear ring 116 is shortened still more and the diameter of the internal annular bearing surface 161 still further decreased. This arrangement permits a more direct thrust on the internal annular bearing surface 161 from the countershaft gear 121. In this form the internal gear 117 of the gear ring 116 is straddled by the internal bearings 163 and the external bearings 169. The bearing ring 165 may be lengthened somewhat so that the bearings 163 may be offset from the bearings 107, and the diameter of the internal bearing surface 161 further decreased.

Figure 3:
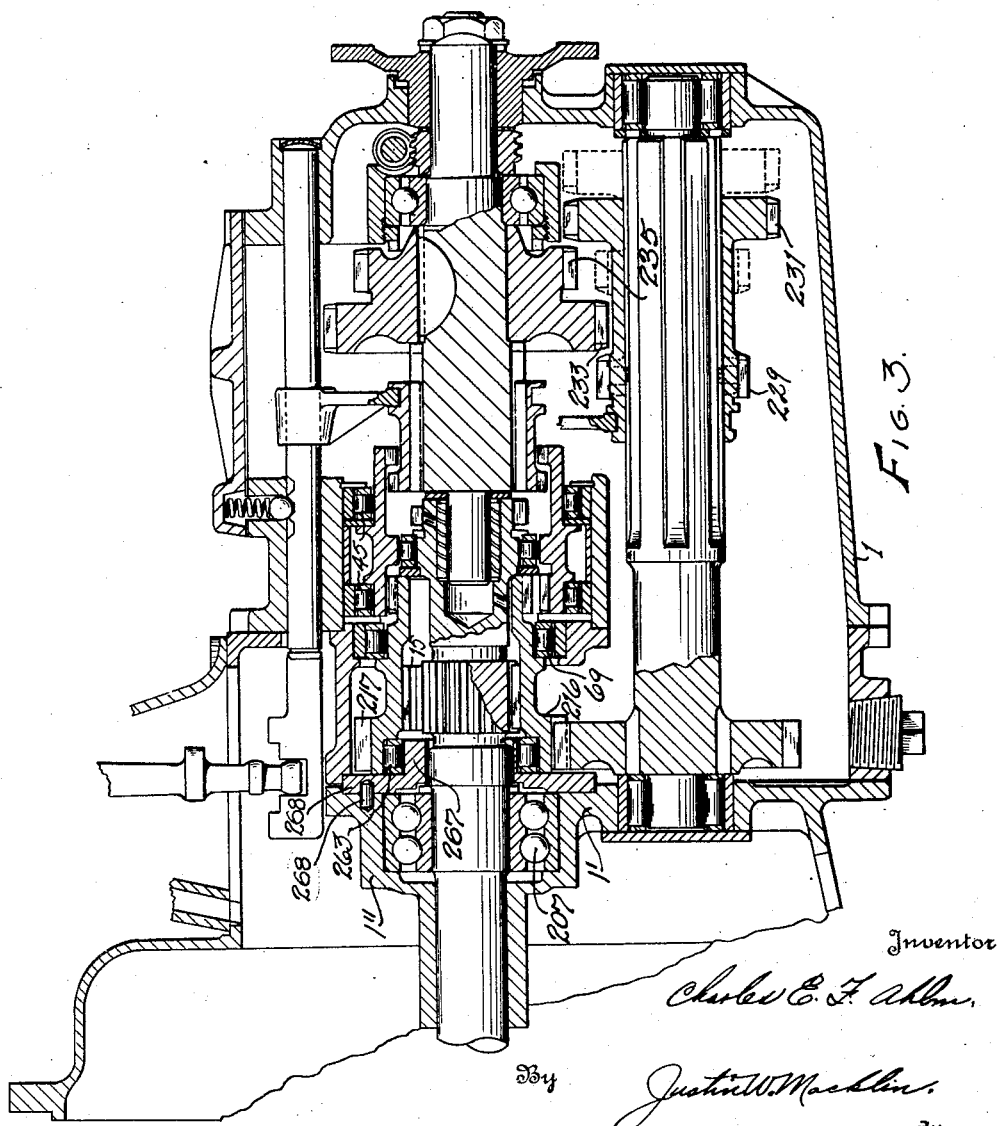
Fig. 3 is a longitudinal vertical section through a transmission gearing embodying still another form of my invention.
Figures 4, 5:
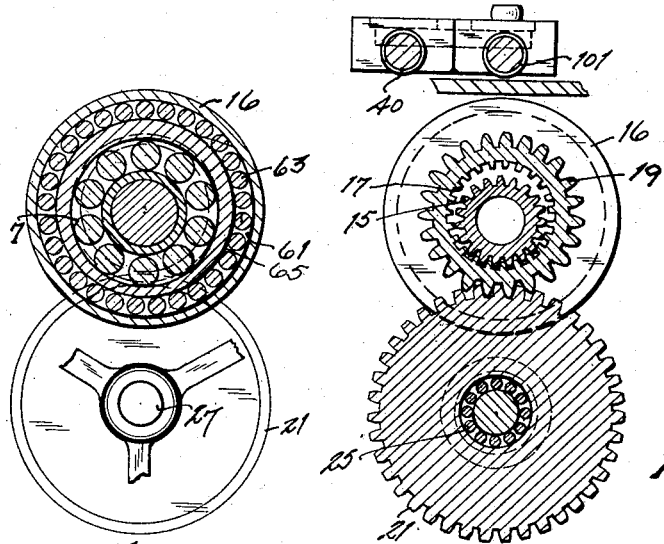
Fig. 4 is a sectional view taken on line 4—4 of Fig. 1.
Fig. 5 is a partial sectional view taken on line 5—5 of Fig. 1.
Figure 6:
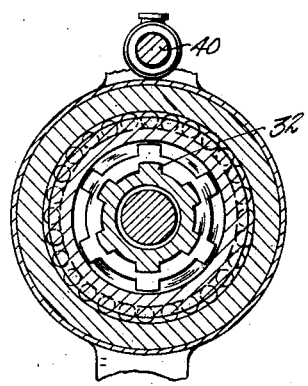
Fig. 6 is a partial sectional view taken on line 6—6 of Fig. 1.

Fig. 3 illustrates a modification very much on the order of Fig. 1, the primary difference being that the diameter of the internal bearing for the gear ring 216 is considerably reduced in size and a somewhat more rigid arrangement is provided for supporting this bearing eccentrically of the driving shaft axis. The bearing supporting member 267 for rollers 263, has an outwardly extending flange 268, which may be secured in place between the casing sections 1 and 1', the flange being seated in shouldered recesses between these casing sections and held against rotation by a suitable number of dowel pins, one being shown at 269. The flange in this instance constitutes a retainer for the bearing 207 of the driving shaft which is supported in a forwardly extending tubular boss 1'' on the casing section 1'. The arrangement results in a very substantial support for the gear ring 216 at its forward end and the driving reactions resulting from the teeth 217 turning the constant mesh countershaft gear under load, are absorbed directly by the heavy flanged support 267, the bearings 263 being in radial alignment with the external counter-shaft driving teeth of the gear ring.

A further difference in Fig. 3 is that the intermediate reduction gears 229 and 231 are slidable on the counter-shaft into mesh with cooperating gears 233 and 235 on the driven shaft, whereas in Fig. 1, the act of rendering the counter-shaft reduction gears active results from shifting a sliding gear on the driven shaft.

I claim:

1. In a power transmission gearing, a driving shaft, a driven shaft, a counter shaft, reduction gears capable of being shifted from operating to idle positions intermediate said shafts to interconnect said shafts in various speed ratios as each of said intermediate gears are shifted selectively into operating position, said intermediate gears including a ring gear eccentric to one of said shafts, rotatably supported on internal bearings at one portion thereof, and external bearings at another portion, the ring gear having external teeth for driving the counter-shaft and the counter-shaft having a gear thereon in meshing relation with said external teeth.

2. In a selective power transmission gearing, including a housing and driving and driven shafts rotatably mounted therein, a gear train within said housing, said gear train including a ring gear eccentric to said driving shaft, bearing means to rotatably support said ring gear, said bearing means including an external bearing supported by said housing and an internal bearing offset axially therefrom.

3. In a selective power transmission gearing, including a housing and driving and driven shafts rotatably mounted therein, a gear train within said housing, said gear train including a ring gear eccentric to said driving shaft, bearing means to rotatably support said ring gear, said bearing means including an external bearing and an internal bearing offset axially therefrom, a bearing ring for said internal bearing, said bearing ring having an internal bore concentric with the driving shaft whereby said driving shaft may extend through said bearing ring.

4. In a gearing, a casing, a driving and a driven shaft supported thereby in mutual alignment, an internally and externally meshing gear train comprising an eccentric gear ring disposed completely within the casing with a plurality of sets of teeth adapted to be directly drivingly coupled with respective said shafts, and means to render the train drivingly active and idle, a bearing in the casing disposd interiorly of the gear ring, a bearing supporting member rigid with the casing and there being a bearing internally of the supporting member and substantially radially aligned with said first mentioned bearing for rotatably supporting said driving shaft.

In testimony whereof, I hereunto affix my signature.

CHARLES E. F. AHLM.